United States Patent [19]

Schreier et al.

[11] 3,777,876
[45] Dec. 11, 1973

[54] SCRAPER FLIGHT CONVEYOR

[75] Inventors: Josef Schreier, Bochum; Hugo Klimeck, Tonisheide, both of Germany

[73] Assignee: Gebr. Eickhoff, Maschinenfabrik Und Eisengiesserei m.b.H., Bochum, Germany

[22] Filed: Oct. 13, 1971

[21] Appl. No.: 188,795

[30] Foreign Application Priority Data
Oct. 20, 1970 Germany................P 20 51 384.2

[52] U.S. Cl.................. 198/171, 198/137, 198/229
[51] Int. Cl........................ B65g 19/08, B65g 19/22
[58] Field of Search................... 198/171, 168, 137, 198/229; 254/192, 150 R

[56] References Cited
UNITED STATES PATENTS
3,642,253   2/1972   Baldwin et al.................. 254/150 R
3,332,665   7/1965   Bruns................................. 254/192
2,762,495   9/1956   Hart................................... 198/176

FOREIGN PATENTS OR APPLICATIONS
1,456,338   9/1966   France............................. 198/171
901,518     1/1952   Germany........................... 198/229

Primary Examiner—Richard E. Aegerter
Assistant Examiner—James W. Miller
Attorney—T. H. Murray et al.

[57] ABSTRACT

Improvements in scraper flight conveyors and more particularly an improvement in means for guiding a scraper flight conveyor around a bend with the use of upper and lower guide wheels mounted for rotation about a vertical axis extending substantially through the center of curvature of a circularly-curved section of the conveyor.

6 Claims, 3 Drawing Figures

SCRAPER FLIGHT CONVEYOR

BACKGROUND OF THE INVENTION

As is known, scraper flight conveyors are well known in the art for carrying coal, ore and other mined materials from the face area of a mine. The path of such conveyors is usually bent at 90° where the conveyor leads from the face into a mine roadway. Scraper flight conveyors have a central chain with flight attachments connected thereto. They not only carry the gathered mined material to the main transport device in a main mine roadway but also carry and guide the mining machine itself, particularly in the case of a longwall mining machine. In the curved sections of the conveyor, the radially inner ends of the flight attachments abut and slide along the side wall of the channel in which the conveyor moves. These side walls of the conveyor channels take up the radial forces imparted by the conveyor, thereby guiding and horizontally supporting it.

SUMMARY OF THE INVENTION

The present invention resides in a scraper flight conveyor arrangement including superimposed conveyor channels having circularly-curved sections, together with upper and lower conveyor reaches disposed in the channels and each consisting of a central chain having flight attachments connected thereto. The curved sections of the superimposed channels are provided with side walls engaging the ends of the flight attachments and have upper and lower openings formed in the inner side walls thereof. These openings extend horizontally in the planes in which the upper and lower reaches of the conveyor are disposed. Upper and lower guide wheels are mounted for rotation about a vertical axis extending substantially through the center of curvature of the circularly-curved sections of the conveyor channels adjacent the inner side thereof, such that peripheral portions of the outer ends of the upper and lower guide wheels protrude to the upper and lower openings, respectively, in the curved channel sections and engage the inner ends of the flight attachments to thereby support and guide the flight attachments moving through the curved sections of the conveyor channels.

With this arrangement, the ends of the flight attachments do not slide along the side walls of the curved portions of the channels, but rather are supported by the guide wheels which are rotated by the moving upper and lower reaches of the conveyor. Accordingly, essentially no friction is encountered when the conveyor reaches are moving through the curved sections of the channels in spite of large radial forces; and essentially no wear occurs.

Preferably, the guide wheels are mounted for independent rotation in a housing on a common vertical axle and are arranged in such a manner that they extend slightly through the openings in the side walls of the curved channel sections. The direction of rotation depends upon the direction of movement of the conveyor reaches of which the upper and lower reaches move in opposite directions. The guide wheels also prevent the passage of granular material through the openings into the housing. For proper guidance and support of the flight attachments, depressions are formed in the circumference of the guide wheels which receive the ends of the flight attachments. In the preferred embodiment of the invention, sealing strips are provided between the sides of the openings in the curved channel sections and the faces of the guide wheels to prevent the passage of granular material into the interior of the guide wheel housing.

Radial strips are mounted on the upper guide wheel and on the lower side of both guide wheels. Additionally, the guide wheels are provided with openings through which material pushed by the radial strips will fall downwardly to be carried out through an open backside of the housing.

In the embodiment of the invention shown herein, the housing which surrounds the guide wheels consists of upper and lower parts which are maintained in assembled relationship by the vertical axle of the guide wheels together with pins or columns arranged parallel thereto, the housing parts being removably connected to each other by tightening screws. This is particularly advantageous for underground mining operations since it is often impossible to move such large housings fully assembled, the arrangement of the invention permitting assembly of the housing in a simple manner at the place where it is required.

In order to connect the conveyor channel to the aforesaid housing for the guide wheels, support flanges are welded to the bolts adjacent the conveyor channels and the conveyor channels are provided with bottom panels provided with edge portions received between the support flanges. The support flanges also form the side limits of the openings in the inner side walls of the curved conveyor channels adjacent the guide wheels. The support flanges are secured to the conveyor channels by bolts extending through openings in the edge portions of the bottom panels and through openings in the support flanges.

In order to guide the flight attachments into engagement and disengagement with respect to the guide wheels as smoothly as possible, the support flanges are provided with deflectors which guide the flight attachments during their transition from the channel side walls to the guide wheels or from the guide wheels to the channel side walls.

In order to withstand the forces imparted on the guide wheels by the flight attachments of the conveyor reaches, the housing for the guides wheels is provided with a support structure underneath the vertical axle for the guide wheels and a spreader bar is disposed on top of the vertical shaft and forces the shaft downwardly to firmly hold the housing in place.

The above and other objects and features of the invention will become apparent from the following detailed description taken in connection with the accompanying drawings which form a part of this specification, and in which.

Figure 1:
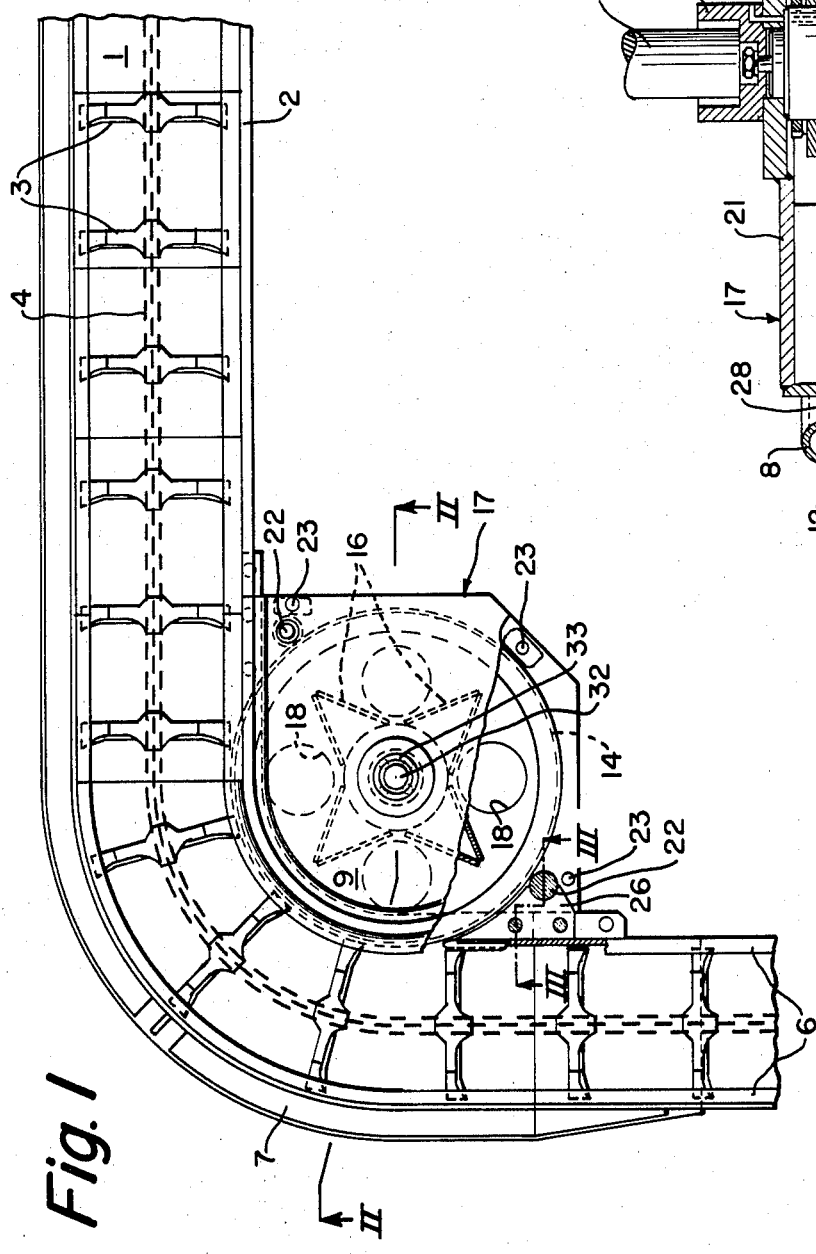
FIG. 1 is a top view of a 90° curve of a scraper flight conveyor incorporating the guide structure of the present invention.
Figure 2:
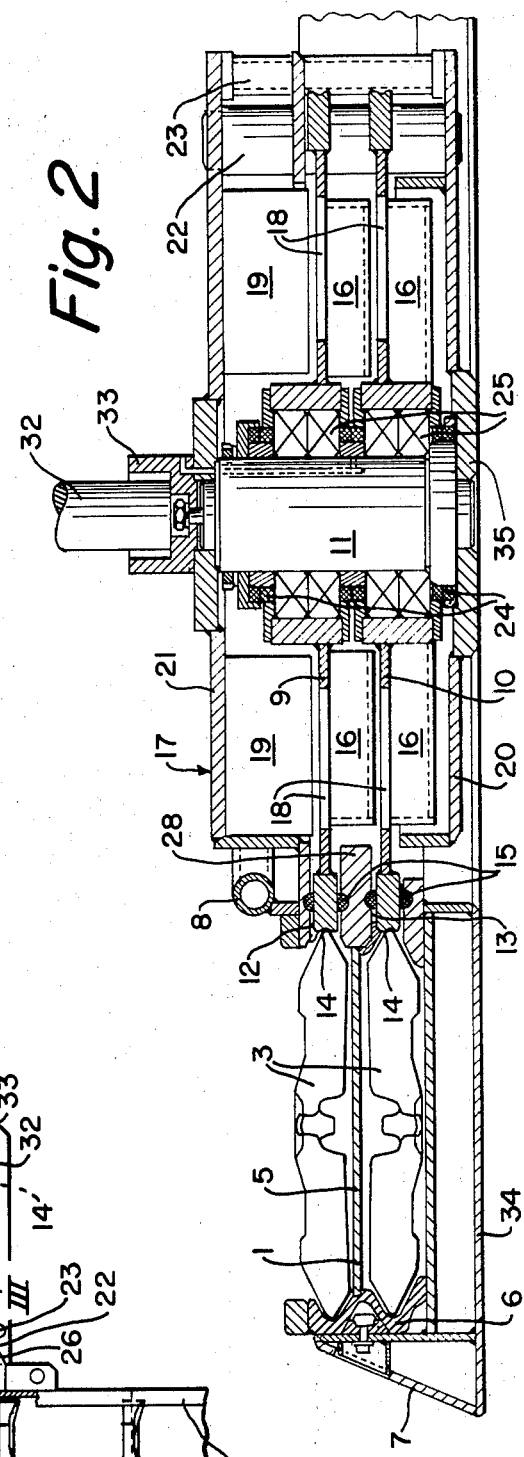
FIG. 2 is a cross-sectional view taken substantially along line II—II of FIG. 1.

With reference now to the drawings, and particularly to FIG. 1, there is shown a scraper flight conveyor 1 having flight attachments 3 mounted on a central chain 4 and disposed in a conveyor channel 2. The scraper flight conveyor drive is not shown. The upper reach of the scraper flight conveyor 1 is disposed above the lower reach but separated therefrom by an intermediate panel 5 (FIG. 2). The ends of the flight attachments 3, which are connected to the chain 4, extend into grooves formed in the side walls 6 (FIG. 2) of the scraper flight conveyor which supports the panel 5. The outer radial side wall 6 is provided with an inclined ramp portion 7 which extends to the upper edge of the scraper flight conveyor 1 and over which mined material is pushed to the upper reach of the conveyor. Movably supported on the scraper flight conveyor is a mining machine, not shown, which mines material from a face area. The mining machine rides on a guide tube 8 of the scraper flight conveyor and is guided by the tube 8 during operation. That is, the mining machine will move back and forth along the length of the conveyor during a mining operation and is guided in its path of travel by the tube 8.

As shown in FIG. 1, the scraper flight conveyor is bent around a right angle curve and leads into a main mine roadway or other area, not shown. In this curve, the upper and lower reaches of the scraper flight conveyor are sidewardly supported by superimposed guide wheels 9, 10 (FIG. 2) which are rotatably supported by a vertical axle 11. In this regard, the circular section of the side wall 6 of channel 2 at the inner radial side of the curve has two openings 12 and 13 formed one above the other in the planes of the respective guide wheels 9 and 10. The outer circumferential portions of the guide wheels 9 and 10 extend through the openings 12 and 13 into the conveyor channel 2 to such an extent that the inner ends of the flight attachments 3 approach the guide wheels tangentially and are received in grooves 14 circumferentially formed in the guide wheels to provide support for the upper and lower reaches of the conveyor. The edges of the openings 12 and 13 adjacent the upper and lower faces of the guide wheels 9 and 10 are preferably provided with gaskets 15 on which the sides of the guide wheels slide and which prevent passage of mined material into the interior of a housing 17 which encloses the guide wheels. Additionally, the guide wheels carry, on their lower sides, radially extending strips which, as shown in FIG. 1, form a star-shaped body adapted to move any granular material entering the housing 17 to and through circular discharge passages 18 formed in the guide wheels. Any granular material collected by the strips 16 falls through the openings or passages 18 to the bottom of the housing 17 and is carried out through the rear, open end of the housing. Radial strips 19 are mounted on the lower side of the top 21 of the housing and also form a star shaped configuration and serve to collect granular material and push it through the openings 18.

The housing 17 consists essentially of a lower plate or bottom 20 and an upper plate or top 21 held in proper position with respect to each other by columns or pins 22 (FIGS. 2 and 3) and the axle 11 which supports the guide wheels 9, 10. The upper and lower plates 20 and 21, positioned by means of the axle 11 and columns 22, are removably connected to each other by means of threaded tubes 23. The guide wheels 9, 10 are supported by roller bearings 25 mounted in the hubs of the wheels and sealed by gaskets 24. Since the upper and lower reaches of the conveyor move in opposite directions, the guide wheels 9, 10 will also rotate in opposite directions during operation.

Figure 3:
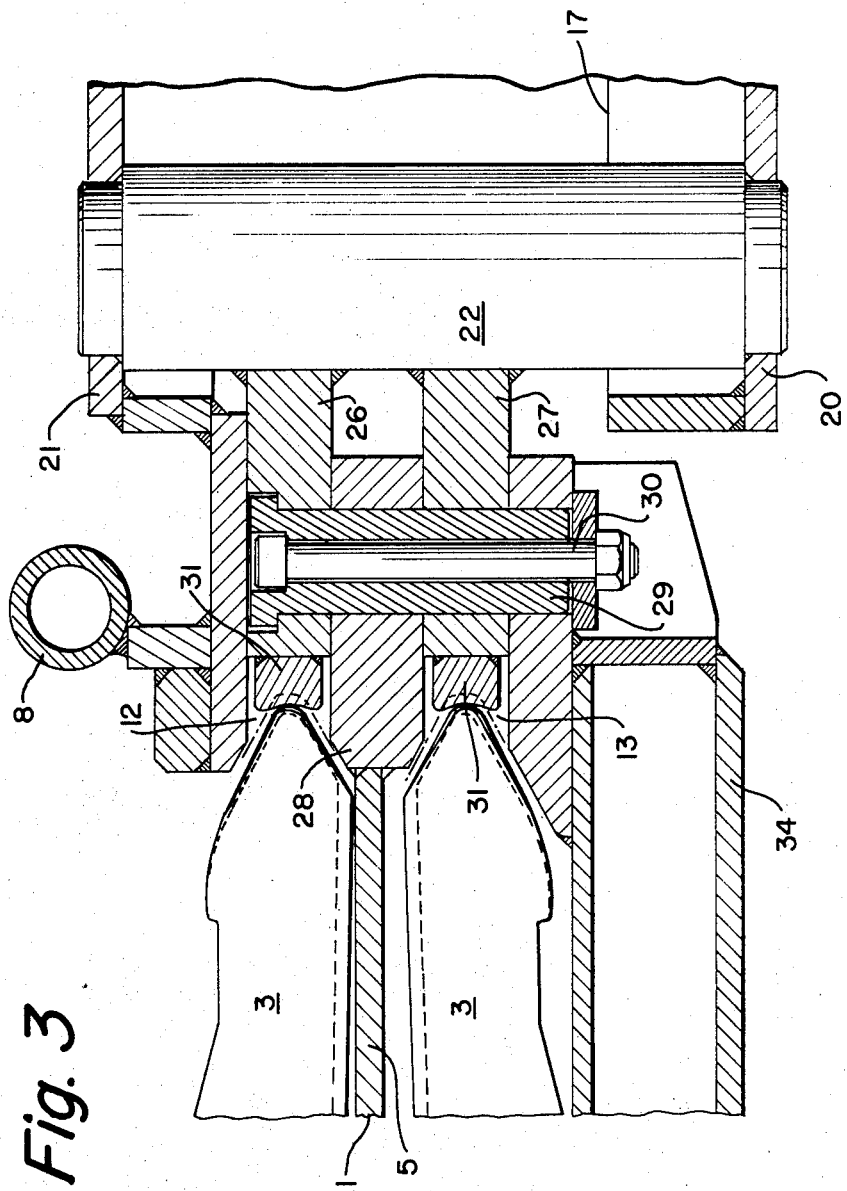
FIG. 3 is a cross-sectional view taken substantially along line III—III of FIG. 1.

The columns or pins 22 adjacent the conveyor channel 2, as best shown in FIG. 3, are provided with support flanges 26 and 27 welded or otherwise secured thereto at a predetermined distance from each other.

The flanges 26 and 27 receive therebetween a flange 28 connected to and reinforcing the edge portion of panel 5 in the area of the openings 12 and 13. The flanges 26 and 27 form the ends of the openings 12 and 13 in the longitudinal direction. Flange 28 and the flanges 26 and 27 are connected to each other by sleeves 29 extending through openings in the flanges. A threaded bolt 30 extends through the sleeve 29 and connects the housing 17 to the scraper flight conveyor 1. The flanges 26 and 27 carry deflectors 31 which guide the ends of the flight attachments 3 smoothly into and out of engagement with the guide wheels 9 and 10. A spreader bar 32, only the lower portion of which is shown in FIG. 2, firmly holds the housing 17 and the guide wheels carried therein between the floor and ceiling of a mine area. The lower end of the spreader bar 32, as shown in FIG. 2, is mounted in an insert 33 disposed on the top 21 of the housing 17 in axial alignment with the axle 11 of the two guide wheels 9 and 10 and firmly presses the housing against the floor, thereby providing firm engagement of housing support 35 with the floor. In the curved areas of the scraper flight conveyor, a plate 34 serves to reinforce it and assumes forces accruing during movement of the scraper flight conveyor from one place to another.

Although the invention has been shown in connection with a certain specific embodiment, it will be readily apparent to those skilled in the art that various changes in form and arrangement of parts may be made to suit requirements without departing from the spirit and scope of the invention.

We claim as our invention:

1. A scraper flight conveyor including conveyor channels having superimposed circularly curved conveyor channel sections, upper and lower conveyor reaches disposed in said channels, said reaches including flight attachments, an endless chain connected centrally between the inner and outer ends of said flight attachments, said channels being provided with side walls on either side of the flight attachments and having upper and lower openings formed in the inner side walls of the curved conveyor channel sections, said openings extending substantially horizontally in the planes in which the upper and lower reaches are disposed, a vertical shaft extending substantially through the center of curvature of the circularly curved channel sections, upper and lower housing parts for supporting said shaft, means for securing together said housing parts, upper and lower guide wheels mounted for independent rotation about said shaft, said guide wheels including surfaces protruding through the respective ones of said upper and lower openings for contacting the inner ends of flight attachments to thereby sidewardly support the conveyor reaches moving through the curved channel sections, vertical columns extending between said housing parts, said columns including support flanges attached thereto adjacent the conveyor channels, said conveyor channels being removably supported and attached to said housing by said flanges, and said conveyor channels having an intermediate panel provided with edge portions received between said support flanges in the manner that said flanges form longitudinal limits for the openings in said curved channel sections.

2. The scraper flight conveyor as claimed in claim 1, wherein said surfaces on said the guide wheels comprise spaced depressions formed in their peripheries for the reception of the ends of the flight attachments.

3. The scraper flight conveyor as claimed in claim 1, wherein sealing gaskets are disposed between the upper and lower edges of said openings in the curved channel sections and said surfaces on the guide wheels projecting therethrough.

4. The scraper flight conveyor as claimed in claim 1, wherein stationary strips are mounted in the housing and disposed above the upper guide wheel, radially extending strips secured to the underside of each guide wheel for rotation therewith, and openings formed in the guide wheels to permit passage of granular material collected by said strips.

5. The scraper flight conveyor as claimed in claim 1, wherein deflectors are carried by the support flanges and are adapted to guide the flight attachments smoothly onto the guide wheels.

6. The scraper flight conveyor as claimed in claim 1, wherein said housing is provided with a support structure underneath said vertical shaft and a spreader bar is disposed on top of the vertical shaft and forces the shaft downwardly to firmly hold the housing in place.

* * * * *